United States Patent
Yamaguchi et al.

(10) Patent No.: US 7,294,075 B2
(45) Date of Patent: Nov. 13, 2007

(54) DEVICE AND METHOD FOR SETTING BELT CLAMPING PRESSURE

(75) Inventors: Hiroyuki Yamaguchi, Seto (JP); Hiroyuki Nishizawa, Tajimi (JP); Hideyuki Suzuki, Nisshin (JP); Masataka Osawa, Nagoya (JP); Kunihiro Iwatsuki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 651 days.

(21) Appl. No.: 10/853,554

(22) Filed: May 26, 2004

(65) Prior Publication Data

US 2004/0242355 A1    Dec. 2, 2004

(30) Foreign Application Priority Data

May 27, 2003    (JP)    ............... 2003-149451

(51) Int. Cl.
*F16H 61/00* (2006.01)
(52) U.S. Cl. .......................................... 474/28
(58) Field of Classification Search .................... 474/8, 474/18, 28; 477/44, 45
See application file for complete search history.

(56) References Cited

FOREIGN PATENT DOCUMENTS

JP    4-357336    12/1992
JP    2003-130195    5/2003

Primary Examiner—Vicky A. Johnson
(74) Attorney, Agent, or Firm—Oblon, Spivak, McClelland, Maier & Neustadt, P.C.

(57) ABSTRACT

A belt clamping pressure setting device includes: a belt clamping pressure setting unit that sets a belt clamping pressure of a continuously variable transmission that includes an input-side pulley, an output-side pulley, and a belt running between the input-side pulley and the out-side pulley; an input revolution detection sensor that detects a number of input revolutions of the input-side pulley; an output revolution detection sensor that detects a number of output revolutions of the output-side pulley; an input torque detection unit that detects an input torque to the input-side pulley; a reference clamping pressure computing unit that computes a reference clamping pressure, based on the number of input revolutions detected by the input revolution detection sensor, the number of output revolutions detected by the output revolution detection sensor, and the input torque detected by the input torque detection unit; and a belt clamping pressure computing unit that computes the belt clamping pressure to be set by the belt clamping pressure setting unit based on the reference clamping pressure and a correction value computed in accordance with the number of input revolutions detected by the input revolution detection sensor or a torque fluctuation frequency obtained from the number of input revolutions.

14 Claims, 14 Drawing Sheets

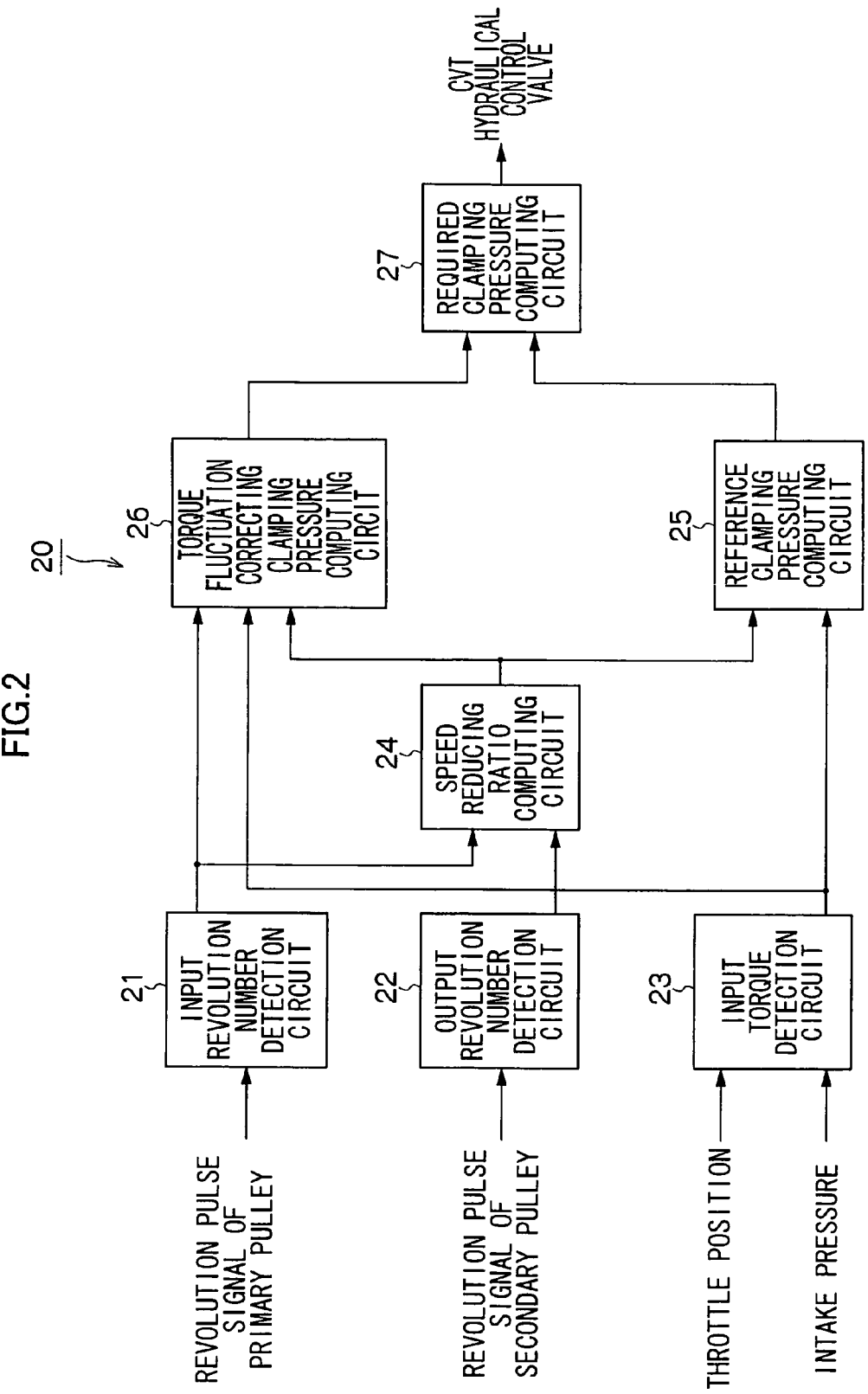

γ=0.65

γ=1.0

γ=1.51 slip(=1-SPEED OF SECONDARY SHEAVE/BELT SPEED)[%]

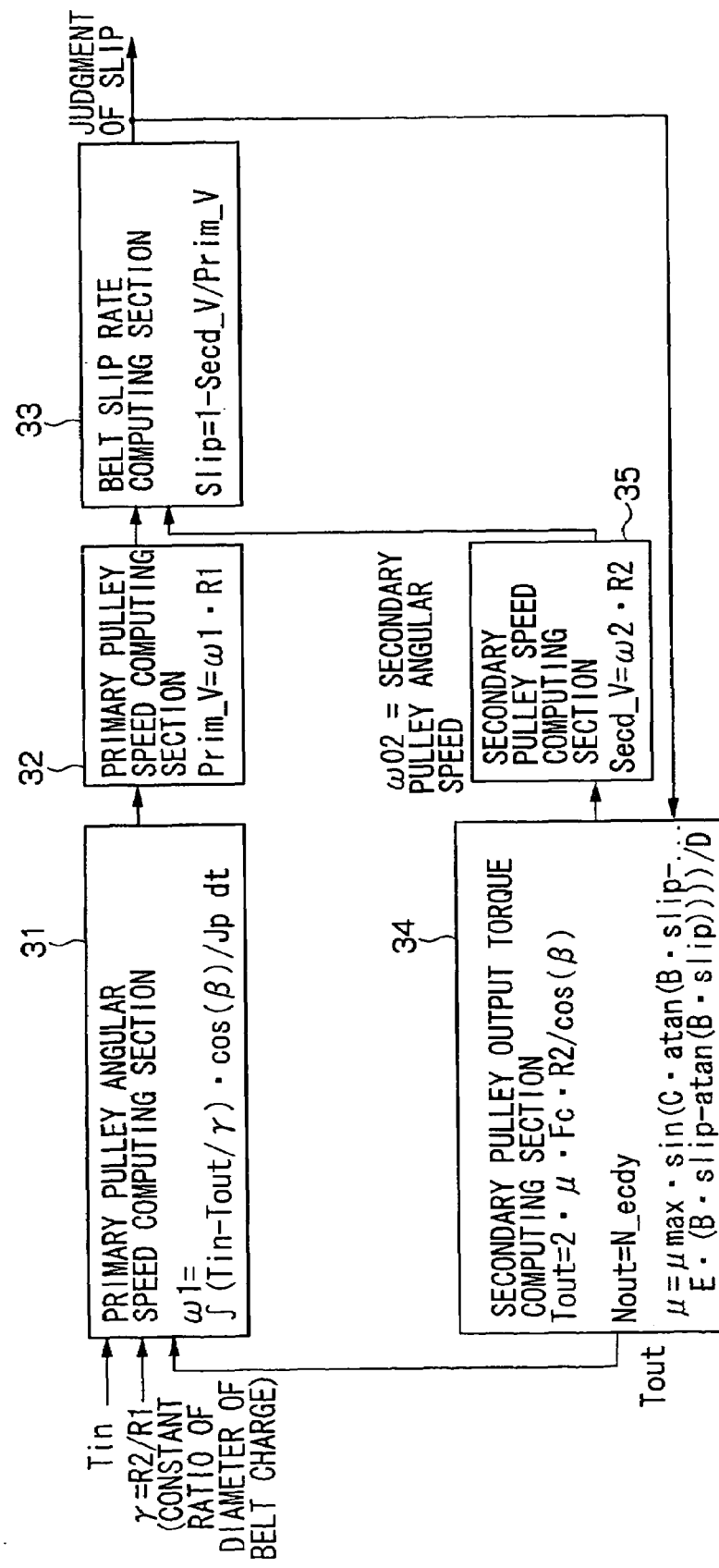

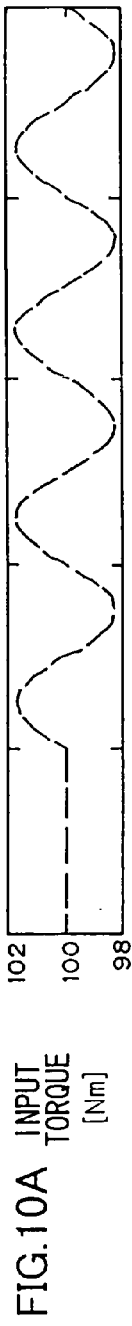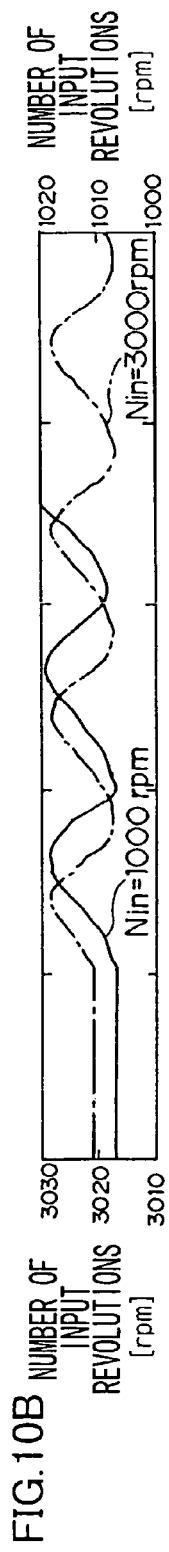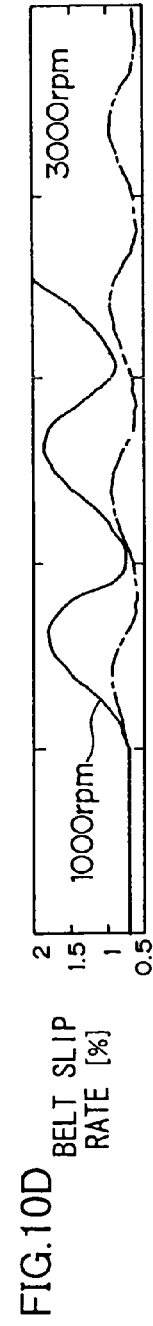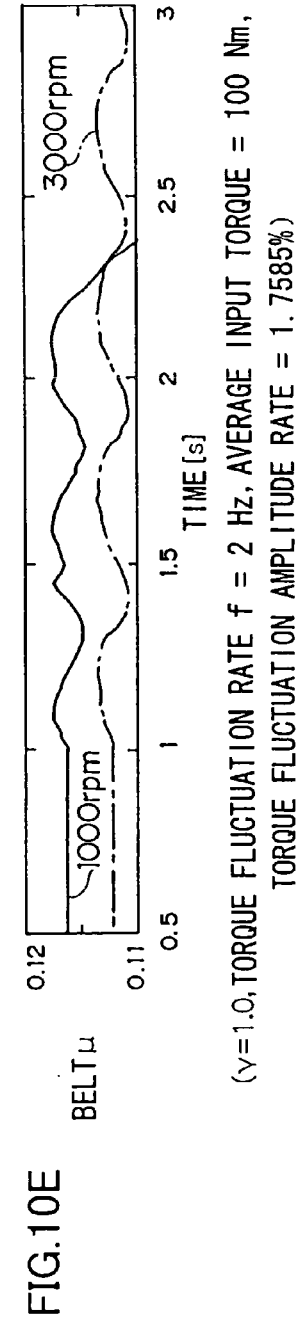
FIG.10A INPUT TORQUE [Nm]
FIG.10B NUMBER OF INPUT REVOLUTIONS [rpm]
FIG.10C FLUCTUATION IN SLIP SPEED [m/s]
FIG.10D BELT SLIP RATE [%]
FIG.10E BELT μ
(γ=1.0, TORQUE FLUCTUATION RATE f = 2 Hz, AVERAGE INPUT TORQUE = 100 Nm, TORQUE FLUCTUATION AMPLITUDE RATE = 1.7585%)

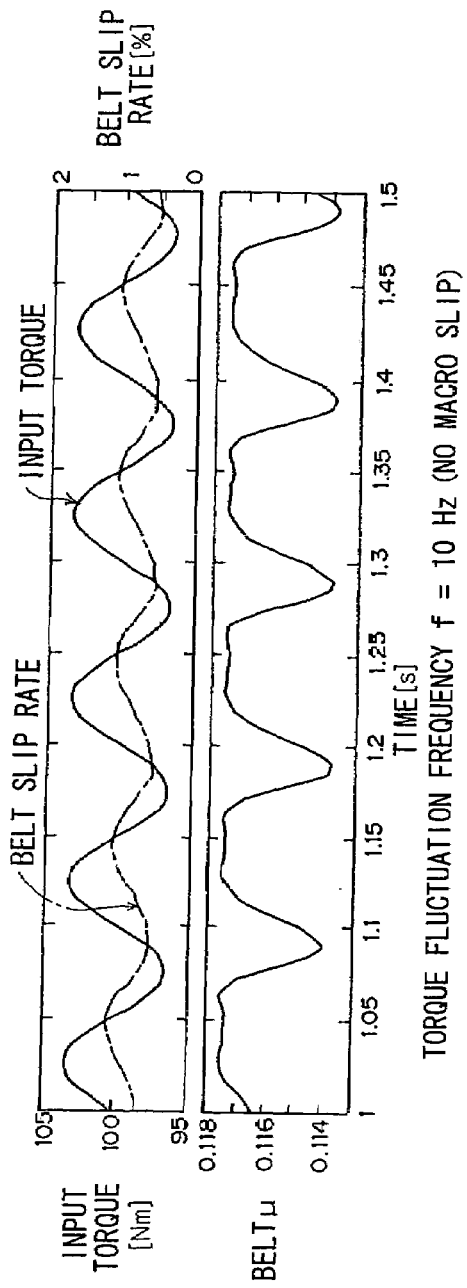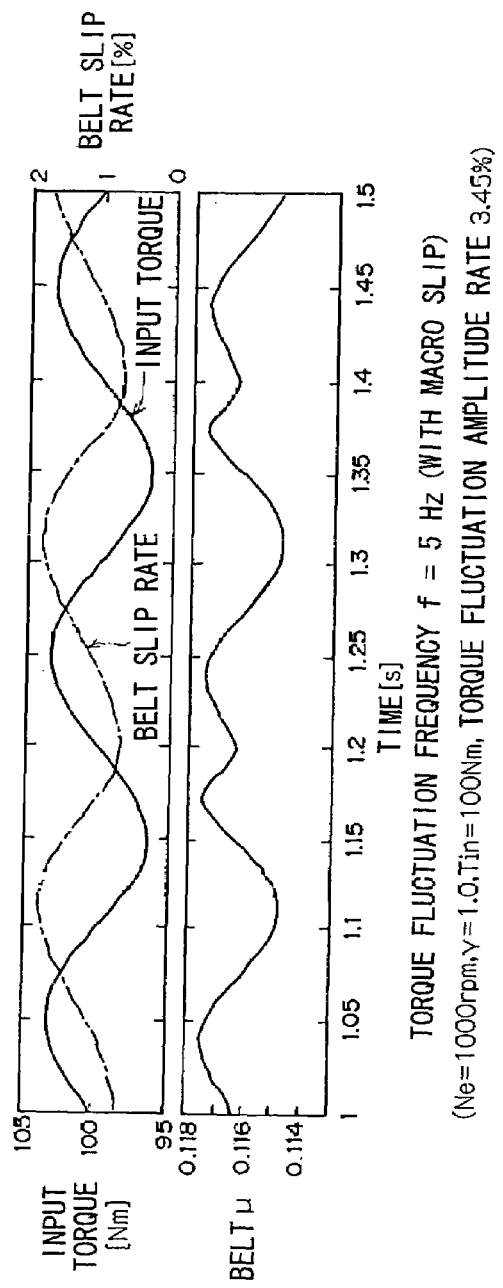
FIG.12A TORQUE FLUCTUATION FREQUENCY f = 10 Hz (NO MACRO SLIP)
FIG.12B TORQUE FLUCTUATION FREQUENCY f = 5 Hz (WITH MACRO SLIP)
(Ne=1000rpm,γ=1.0,Tin=100Nm, TORQUE FLUCTUATION AMPLITUDE RATE 3.45%)

CASE OF $\gamma = 0.65$

CASE OF $\gamma = 1.0$

CASE OF $\gamma = 1.51$

DEVICE AND METHOD FOR SETTING BELT CLAMPING PRESSURE

CROSS-REFERENCE TO RELATED APPLICATION

This application claims priority under 35 U.S.C. 119 from Japanese Patent Application No. 2003-149451, the disclosure of which is incorporated by reference herein.

BACKGROUND OF THE INVENTION

1. Field of the Invention

The present invention relates to a device and a method for setting belt clamping pressure, and, more particularly, to a belt clamping pressure setting device and method, by which belt clamping pressure is set for a continuously variable transmission (CVT).

2. Description of the Related Art

Conventionally, there has been proposed a CVT hydraulic control device by which clutch pressure for forward and reverse motion can be set in accordance with engine torque in a CVT (for example, refer to the Japanese Patent Application Laid-Open (JP-A) No. 4-357336).

The CVT hydraulic control device judges whether the engine torque has changed or not, and, when it has changed, it judges whether the changed amount is equal to or larger than a predetermined value or not. When the amount is equal to or larger than the predetermined value, a correction amount, by which clutch pressure corresponding to the changed amount is set, for a duty ratio of an electromagnetic valve, is calculated according to a formula (3) disclosed in JP-A No. 4-357336. Then, deterioration in the response of duty control time to torque fluctuations is prevented by directly adding the correction amount to the duty ratio for hydraulic pressure.

The above-described CVT hydraulic control device controls pressure for clamping the CVT belt (belt clamping pressure) so that the pressure is increased at any time when the torque fluctuations are equal to or larger than a predetermined value, regardless of the values of the torque fluctuations, that is, the number of input revolutions of the CVT.

However, there is actually a case in which the belt clamping pressure is sufficient, even if the torque fluctuations are equal to or larger than the predetermined value. Therefore, there has been a problem that there is increased pumping loss in the CVT hydraulic control when the belt clamping pressure is forced to be increased under circumstances in which the torque fluctuations are equal to or larger than the predetermined value, and as a result, the fuel consumption is caused to be lowered.

SUMMARY OF THE INVENTION

The present invention has been proposed in order to solve the above-described problem.

The invention has solved the above-described problem by finding an area in which the belt clamping pressure is not required to be corrected, or there are no torque fluctuations to be corrected when a number of engine revolutions (number of input revolutions) is increased even if the amplitude of the torque fluctuations are large.

A first aspect of the invention is to provide a belt clamping pressure setting device comprising: a belt clamping pressure setting unit that sets a belt clamping pressure of a continuously variable transmission that includes an input-side pulley, an output-side pulley, and a belt running between the input-side pulley and the out-side pulley; an input revolution detection sensor that detects a number of input revolutions of the input-side pulley; an output revolution detection sensor that detects a number of output revolutions of the output-side pulley; an input torque detection unit that detects an input torque to the input-side pulley; a reference clamping pressure computing unit that computes a reference clamping pressure, based on the number of input revolutions detected by the input revolution detection sensor, the number of output revolutions detected by the output revolution detection sensor, and the input torque detected by the input torque detection unit; and a belt clamping pressure computing unit that computes the belt clamping pressure to be set by the belt clamping pressure setting unit based on the reference clamping pressure and a correction value computed in accordance with the number of input revolutions detected by the input revolution detection sensor or a torque fluctuation frequency obtained from the number of input revolutions.

The input revolution detection sensor detects a number of input revolutions which is a number of revolutions of the input-side pulley. Here, the sensor may detect number of engine revolutions, assuming that the number of engine revolutions is equivalent to the number of input revolutions. The output revolution detection sensor detects a number of output revolutions which is a number of revolutions of the output-side pulley.

The input torque detection unit detects an input torque to the input-side pulley from an engine. The input torque described here is, for example, average input torque which is estimated from a degree of opening of a throttle valve, or an amount of air inflow in an engine. Then, the reference clamping pressure computing unit computes the reference clamping pressure generating no belt slip, based on the number of input revolutions, the number of output revolutions, and the input torque.

Here, an actual input torque instantaneously changes too much in accordance with revolution explosions. However, instantaneous changes in the input torque have not been considered in the reference clamping pressure. When the torque fluctuation amplitude of the input torque is large, insufficient belt clamping pressure is caused in some cases to generate belt slip, even if the belt clamping pressure is set so that the pressure becomes the reference clamping pressure. In such a case, belt correcting clamping pressure (correction value) is required. On the other hand, there is an area in which the correction value is not required in accordance with the larger number of input revolutions, or the higher torque fluctuation frequency even when the torque fluctuation amplitude of the input torque is large.

Therefore, in the belt clamping pressure setting device according to the first aspect of the invention, the reference clamping pressure is computed, based on the number of input revolutions, the number of output revolutions, and the input torque, and the belt clamping pressure is computed, based on the correction value computed according to the number of input revolutions or the torque fluctuation frequency, and on the reference clamping pressure. That is, the optimal belt clamping pressure is set according to the number of input revolutions, or the torque fluctuation frequency when there is a possibility that the belt slip is caused. As a result, both of prevention of the belt slip and improvement in the fuel consumption can be realized by setting necessary and minimum belt clamping pressure.

In the belt clamping pressure setting device according to the first aspect of the invention, the belt clamping pressure may be computed when the number of input revolutions is in an area in which the numbers of revolutions are low, or when the torque fluctuation frequency is in an area in which the frequencies are low.

The belt clamping pressure setting device according to the first aspect of the invention may further comprises a speed reducing ratio computing unit that computes a speed reducing ratio, based on the number of input revolutions detected by the input revolution detection sensor, and the number of output revolutions detected by the output revolution detection sensor, and the belt clamping pressure computing unit may compute the correction value in accordance with the speed reducing ratio computed by the speed reducing ratio computing unit and the number of input revolutions or the torque fluctuation frequency.

As described above, there is an area in which the correcting clamping pressure is not required in accordance with the larger number of input revolutions, or the higher torque fluctuation frequency even when the torque fluctuation amplitude of the input torque is large. At this time, the area in which the correcting clamping pressure is not required has a property of changing in accordance with the larger speed reducing ratio.

Then, according to the above-described invention, necessary and minimum belt clamping pressure can be set by computing the correction value in accordance with the number of input revolutions, or the torque fluctuation frequency, and to the speed reducing ratio even in a state in which the speed reducing ratio changes. Accordingly, both of prevention of the belt slip and improvement in the fuel consumption can be realized.

In the belt clamping pressure setting device according to the first aspect of the invention, the belt clamping pressure computing unit may compute the correction value, using an input torque fluctuation amplitude rate at or before a macro slip limit, which has been obtained, referring to a table indicating relations among speed reducing ratios, number of input revolutions or torque fluctuation frequencies, and input torque fluctuation amplitude rates at or before a macro slip limit, based on the number of input revolutions detected by the input revolution detection sensor or the torque fluctuation frequency obtained from the number of input revolutions, and the speed reducing ratio computed by the speed reducing ratio computing unit.

The table indicates relations among speed reducing ratios, number of input revolutions or torque fluctuation frequencies, and input torque fluctuation amplitude rates at or before a macro slip limit. Moreover, the input torque fluctuation amplitude rate at or before a macro slip limit indicates a value at or before the macro slip limit of a range in which the macro slip is not caused when the belt clamping pressure is set at the reference clamping pressure.

The belt clamping pressure computing unit obtains the input torque fluctuation amplitude rate at or before a macro slip limit, referring to the table, based on the computed speed reducing ratio, and the detected number of input revolutions or the torque fluctuation frequency. Here, the belt correcting clamping pressure becomes unnecessary, for example, when the obtained input torque fluctuation amplitude rate at or before the macro slip limit exceeds a expected maximum amplitude rate of the input torque. On the other hand, when the predetermined maximum amplitude rate of the input torque is not exceeded, the belt correcting clamping pressure is required.

Therefore, according to the above-described invention, the input torque fluctuation amplitude rate at or before a macro slip limit is obtained, referring to the table, based on the number of input revolutions or the torque fluctuation frequency, and the computed speed reducing ratio. Moreover, the belt clamping pressure can be set by computing the correction value, using the obtained input torque fluctuation amplitude rate, so that the fuel consumption is improved and, at the same time, the macro slip is not caused a second aspect of the invention is to provide a belt clamping pressure setting device comprising: a belt clamping pressure setting unit that sets a belt clamping pressure of a continuously variable transmission that includes an input-side pulley, an output-side pulley, and a belt running between the input-side pulley and the out-side pulley; an input revolution detection sensor that detects a number of input revolutions of the input-side pulley; an output revolution detection sensor that detects a number of output revolutions of the output-side pulley; an input torque detection unit that detects an input torque to the input-side pulley; a torque fluctuation computing unit that computes a torque fluctuation to be corrected in accordance with the number of input revolutions detected by the input revolution detection sensor or a torque fluctuation frequency obtained from the number of input revolutions; and a belt clamping pressure computing unit that computes the belt clamping pressure to be set by a belt clamping pressure setting unit, based on the number of input revolutions detected by the input revolution detection sensor, the number of output revolutions detected by the output revolution detection sensor, the input torque detected by the input torque detection unit, and the torque fluctuation computed by the torque fluctuation computing unit.

The input torque is, for example, average input torque which is estimated from a degree of opening of a throttle valve, or an amount of air inflow in an engine. However, an actual input torque instantaneously changes too much in accordance with engine revolution explosions.

When the belt clamping pressure is computed, based on the number of input revolutions or the torque fluctuation frequency, the number of output revolutions, and the input torque, changes in the input torque (torque fluctuation) have not been considered in the belt clamping pressure. Therefore, unless, when the torque fluctuation is large, the belt clamping pressure is computed under consideration of the torque fluctuation, insufficient belt clamping pressure is caused to generate belt slip.

On the other hand, there is a tendency that even when the torque fluctuation is large, a macro slip limit increases in accordance with larger number of input revolutions or higher torque fluctuation frequency. Thereby, there is an area in which the torque fluctuation to be corrected is not required in accordance with the larger number of input revolutions, or the higher torque fluctuation frequency. Then, the torque fluctuation computing unit computes the torque fluctuation to be corrected in accordance with the number of input revolutions or the torque fluctuation frequency.

Therefore, in the belt clamping pressure setting device according to the second aspect of the invention, the torque fluctuation is computed according to the number of input revolutions or the torque fluctuation frequency, the belt clamping pressure is computed, based on the number of input revolutions, the number of output revolutions, the input torque, and the torque fluctuation, and then, the torque fluctuation to be corrected can be computed according to the number of input revolutions or the torque fluctuation frequency when there is a possibility that the macro slip is caused. Thereby, necessary and minimum belt clamping pressure can be set to realize both of prevention of the belt slip and improvement in the fuel consumption.

The belt clamping pressure setting device according to the second aspect of the invention may further comprises a speed reducing ratio computing unit that computes a speed reducing ratio, based on the number of input revolutions detected by the input revolution detection sensor, and the number of output revolutions detected by the output revolution detection sensor, and the torque fluctuation computing unit may computes the torque fluctuation in accordance with the speed reducing ratio computed by the speed reducing ratio computing unit.

As described above, there is an area in which the torque fluctuation to be corrected is not required in accordance with the larger number of input revolutions, or the higher torque fluctuation frequency even when the torque fluctuation amplitude of the input torque is large. At this time, the area in which the torque fluctuation to be corrected is not required has a property of changing according to the larger speed reducing ratio.

Then, according to the above-described invention, the torque fluctuation computing unit computes the torque fluctuation, further using the speed reducing ratio computed by the speed reducing ratio computing unit, and then, necessary and minimum belt clamping pressure can be set to realize both of prevention of the belt slip and improvement in the fuel consumption even in a state in which the speed reducing ratio changes.

The belt clamping pressure setting device according to the second aspect of the invention may computes the torque fluctuation, using an input torque fluctuation amplitude rate at or before a macro slip limit, which has been obtained, referring to a table indicating relations among speed reducing ratios, number of input revolutions or torque fluctuation frequencies, and input torque fluctuation amplitude rates at or before a macro slip limit, based on the number of input revolutions detected by the input revolution detection sensor or the torque fluctuation frequency obtained from the number of input revolutions, and the speed reducing ratio computed by the speed reducing ratio computing unit.

The torque fluctuation computing unit obtains the input torque fluctuation amplitude rate at or before a macro slip limit, referring to the table, based on the speed reducing ratio, the number of input revolutions or the torque fluctuation frequency. The torque fluctuation to be corrected becomes unnecessary, for example, when the obtained input torque fluctuation amplitude rate at or before the macro slip limit exceeds a expected maximum amplitude rate of the input torque. On the other hand, when the expected maximum amplitude rate of the input torque is not exceeded, the torque fluctuation to be corrected is required.

Therefore, according to the above-described invention, the input torque fluctuation amplitude rate at or before a macro slip limit is obtained, referring to the table, based on the number of input revolutions or the torque fluctuation frequency, and the speed reducing ratio. Then, when the torque fluctuation to be corrected is required, necessary and minimum belt clamping pressure can be set by computing the torque fluctuation, using the obtained input torque fluctuation amplitude rate.

For example, any one of the following ones may be applied to the above-described table.

The above-described table may indicate a relationship in which the input torque fluctuation amplitude rate at or before a macro slip limit increases in accordance with the number of input revolutions increasing or the torque fluctuation frequency getting higher.

The above-described table may indicate a relationship in which the input torque fluctuation amplitude rate at or before a macro slip limit linearly increases in accordance with the number of input revolutions increasing or the torque fluctuation frequency getting higher.

The above-described table may indicate a relation that input torque fluctuation amplitude rate at or before the macro slip limit increases in accordance with the larger speed reducing ratio.

BRIEF DESCRIPTION OF THE DRAWINGS

FIG. 2 is a block diagram showing a configuration of an electronic control unit (ECU).

FIG. 8 is a block diagram of a computing processing unit for the simulation model.

FIG. 10A is a view showing input torque at a number of input revolutions Nin of 1000.

FIG. 10B is a view showing changes in number of input revolutions (Nin: 1000 rpm and 3000 rpm).

FIG. 10C is a view showing fluctuations in slip speed at number of input revolutions (Nin: 1000 rpm and 3000 rpm).

FIG. 10D is a view showing belt slit rates at number of input revolutions (Nin: 1000 rpm and 3000 rpm).

FIG. 10E is a view showing belt $\mu$ at number of input revolutions (Nin: 1000 rpm and 3000 rpm).

FIG. 12A is a view showing changes in input torque and belt $\mu$ with respect to time for a torque fluctuation frequency f of 10 [Hz] (no macro slip).

FIG. 12B is a view showing changes in input torque and belt $\mu$ with respect to time for a torque fluctuation frequency f of 5 [Hz] (with macro slip).

DESCRIPTION OF THE PREFERRED EMBODIMENTS

Hereinafter, preferable embodiments according to the present invention will be explained in detail with references to the drawings.

First Embodiment

Figure 1:
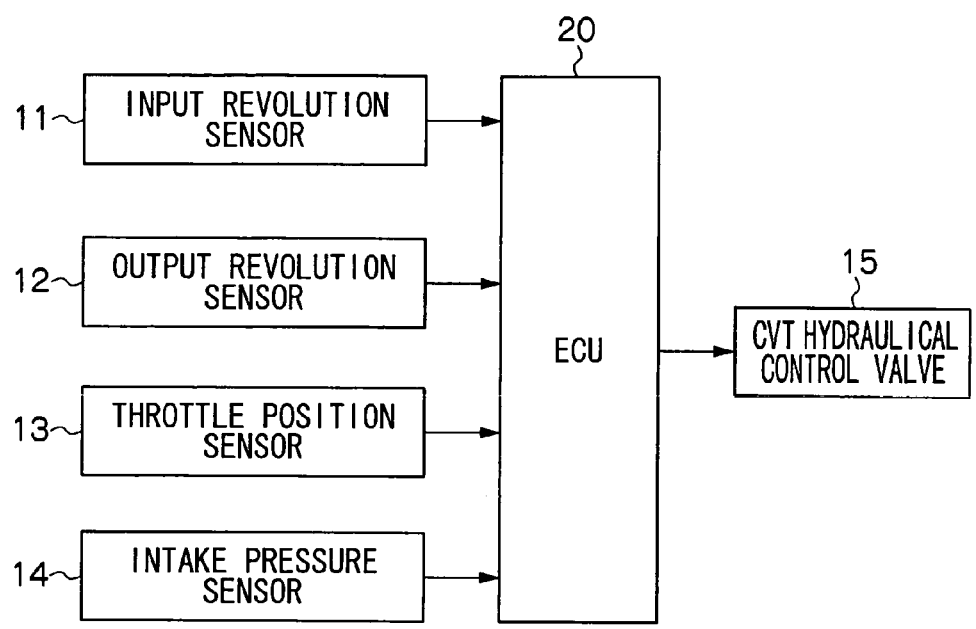
FIG. 1 is a block diagram showing a configuration of a belt clamping pressure setting device according to a first embodiment of the present invention.

FIG. 1 is a block diagram showing a structure of a belt clamping pressure setting device according to a first embodiment of the invention. The belt clamping pressure setting device sets a belt clamping pressure to optimal state for a continuously variable transmission (CVT) comprising a primary belt pulley at an input shaft-side, a secondary belt pulley at an output shaft-side and a belt running between the primary belt pulley and the secondary belt pulley. Each pulley includes a fixed sheave, and a movable sheave urged towards the fixed sheave.

The belt clamping pressure setting device comprises: an input revolution sensor 11 which generates a revolution pulse signal according to a number of revolutions of the primary belt pulley; an output rotation sensor 12 which generates a revolution pulse signal according to the number of revolutions of the secondary belt pulley; a throttle position sensor 13 which outputs a sensor signal according to a degree of opening of a throttle valve in an engine; an intake pressure sensor 14 which outputs a sensor signal according to the intake pressure of the engine; a CVT hydraulic control valve 15 which controls the hydraulics to set the belt clamping pressure; and an electronic control unit (hereinafter, called as "ECU") 20 which controls the CVT hydraulic control valve 15.

FIG. 2 is a block diagram showing a configuration of the ECU 20. The ECU 20 comprises: an input revolution number detection circuit 21 that detects a number of input revolutions for the primary belt pulley; an output revolution number detection circuit 22 that detects a number of output revolutions for the secondary belt pulley; an input torque detection circuit 23 that detects torque input to the primary belt pulley; a speed reducing ratio computing circuit 24 which computes a speed reducing ratio γ; a reference clamping pressure computing circuit 25 which computes a reference clamping pressure; a torque fluctuation correcting clamping pressure computing circuit 26 which computes a correcting clamping pressure according to the input torque fluctuations; and a required clamping pressure computing circuit 27 which computes a required clamping pressure.

The input revolution number detection circuit 21 detects the number of input revolutions Nin [rpm], based on the revolution pulse signal from the input revolution sensor 11, and supplies the number of input revolutions Nin to the speed reducing ratio computing circuit 24 and to the torque fluctuation correcting clamping pressure computing circuit 26.

The output revolution number detection circuit 22 detects the number of output revolutions Nout [rpm], based on the revolution pulse signal from the output revolution sensor 12, and supplies the number of output revolutions Nout to the speed reducing ratio computing circuit 24.

The input torque detection circuit 23 detects an average input torque Tin from the engine to the primary belt pulley, based on an amount the throttle valve is opened, which is based on the sensor signal from the throttle position sensor 13, and on an intake pressure (amount of air inflow), which is based on the sensor signal from the intake pressure sensor 12.

The speed reducing ratio computing circuit 24 computes the speed reducing ratio γ (=Nin/Nout), based on the number of input revolutions Nin and the number of output revolutions Nout, and supplies the speed reducing ratio γ to the reference clamping pressure computing circuit 25 and to the torque fluctuation correcting clamping pressure computing circuit 26.

The reference clamping pressure computing circuit 25 computes a reference clamping pressure Fc_b using the input torque Tin detected by the input torque detection circuit 23, the speed reducing ratio γ computed by the speed reducing ratio computing circuit 24, and predetermined parameters. A computing formula for the reference clamping pressure Fc_b will be described later.

Here, the steady-state input torque Tin can be estimated as described above, using an amount the throttle valve is opened and the amount of air inflow. However, fluctuations in the input torque (fluctuation amplitude) caused by engine revolution explosions cannot be estimated.

Thus, the torque fluctuation correcting clamping pressure computing circuit 26 computes a correcting clamping pressure ΔFc so that macro slip can be prevented even when a maximum torque fluctuation for the input torque is caused.

The torque fluctuation correcting clamping pressure computing circuit 26 stores a table of torque fluctuation amplitude rates. The table of torque fluctuation amplitude rates shows relationships between the number of input revolutions Nin, the speed reducing ratio γ, and the torque fluctuation amplitude rate T_Rlim at a macro slip limit. The table of torque fluctuation amplitude rates indicates, for example, the relationship shown next.

Figure 3A:
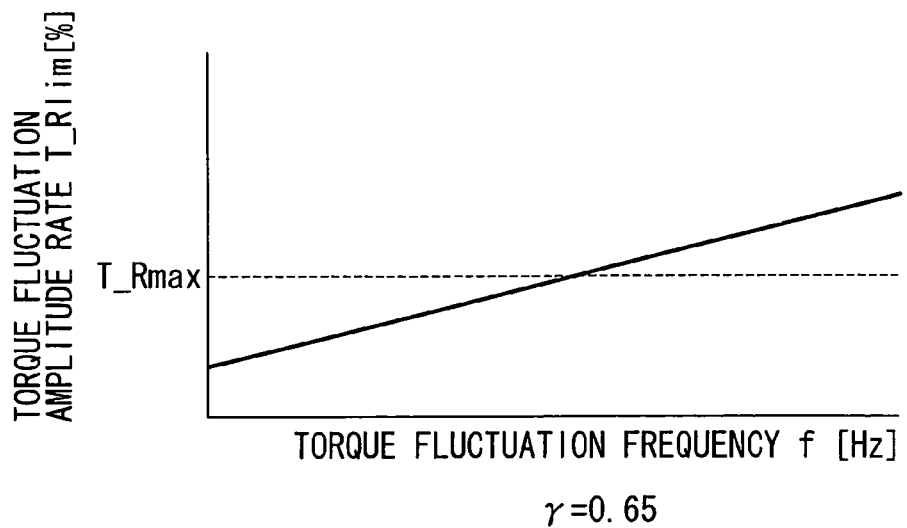
FIG. 3A is a view showing torque fluctuation amplitude rates corresponding to torque fluctuation frequencies at macro slip limit in a case of a speed reducing ratio $\gamma$ of 0.65.
Figure 3B:
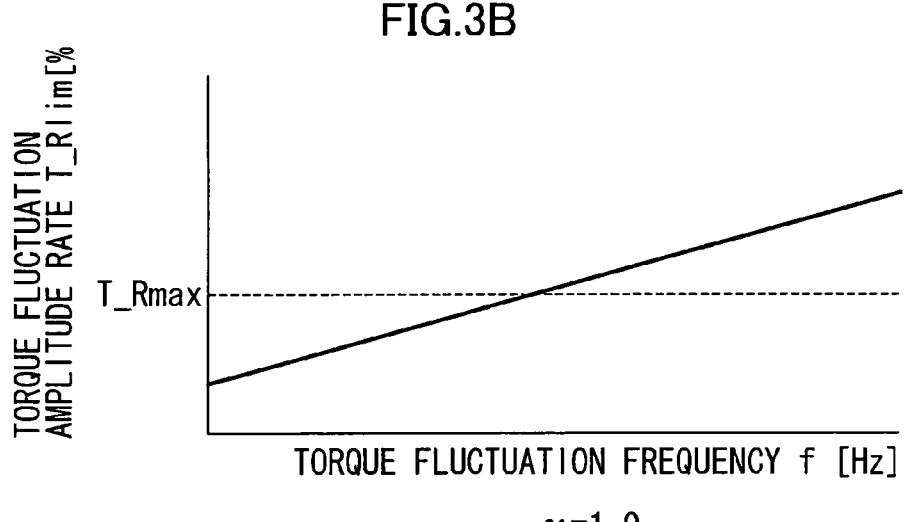
FIG. 3B is a view showing torque fluctuation amplitude rates corresponding to torque fluctuation frequencies at macro slip limit in a case of a speed reducing ratio $\gamma$ of 1.0.
Figure 3C:
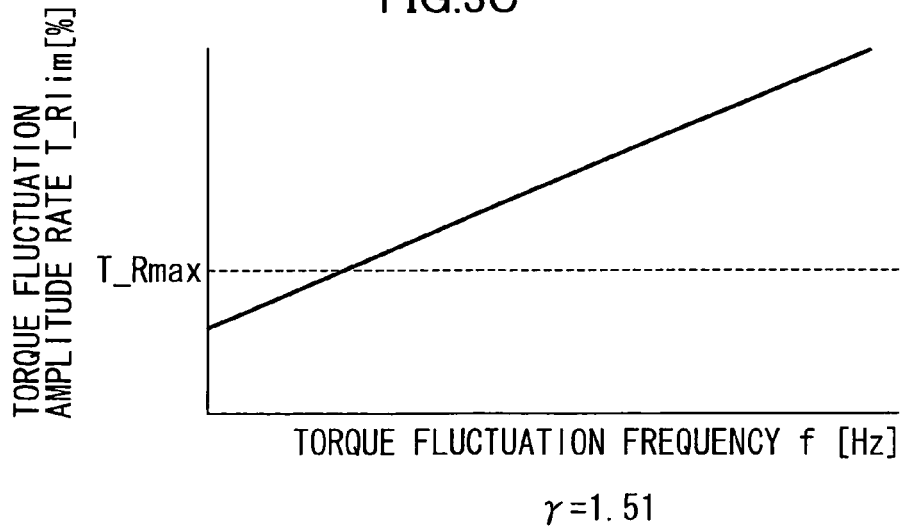
FIG. 3C is a view showing torque fluctuation amplitude rates corresponding to torque fluctuation frequencies at macro slip limit in a case of a speed reducing ratio $\gamma$ of 1.51.

FIGS. 3A through 3C are views showing the torque fluctuation amplitude rates, which correspond to torque fluctuation frequencies, at the macro slip limit. FIG. 3A is a case in which the speed reducing ratio γ is 0.65; FIG. 3B is a case in which the speed reducing ratio γ is 1.0; and FIG. 3C is a case in which the speed reducing ratio γ is 1.51.

Here, parameters in FIGS. 3A through 3B are defined as follows. T_Rlim: a torque fluctuation amplitude rate [%] at a macro slip limit (namely, a torque fluctuation amplitude, for which the macro slip is not caused at the reference clamping pressure Fc_b, /Tin), T_Rmax: a maximum value [%] of expected torque fluctuation amplitude rates (namely, a maximum value of the torque fluctuation amplitudes/Tin).

FIG. 3 shows that the T_Rlim has properties of linearly increasing in accordance with an increase in the torque fluctuation frequency f and increasing in accordance with an increase in the speed reducing ratio γ. On the other hand, T_Rmax is a constant value in the embodiment.

Since the macro slip occurs in an area in which T_Rlim is smaller than T_Rmax, the correcting clamping pressure ΔFc is required in order to prevent the macro slip. Since the macro slip is not caused in an area in which T_Rlim is equal to or larger than T_Rmax, the correcting clamping pressure ΔFc is not required.

The table of torque fluctuation amplitude rates can indicate relations between the number of input revolutions Nin and the torque fluctuation amplitude rates T_Rlim at the macro slip limit at not only the speed reducing ratios γ shown in FIGS. 3A through 3C, but also at various of ratios γ. Thus, in the torque fluctuation correcting clamping pressure computing circuit 26 obtains the torque fluctuation amplitude rates T_Rlim corresponding to the number of input revolutions and the speed reducing ratios γ by referring to the table of torque fluctuation amplitude rates.

Moreover, the circuit 26 computes torque fluctuation ΔT using the torque fluctuation amplitude rates T_Rlim. Then, when the torque fluctuation ΔT is larger than 0, the correcting clamping pressure ΔFc is computed, and, when the torque fluctuation ΔT is equal to or smaller than 0, the correcting clamping pressure ΔFc made to by 0. A computing formula for the correcting clamping pressure ΔFc will be described later.

The required clamping pressure computing circuit 27 computes required belt clamping pressure Fc based on the reference clamping pressure Fc_b and the correcting clamping pressure ΔFc. Then, the belt clamping pressure of the CVT is set so that the above-described required belt clamping pressure Fc is obtained.

In the belt clamping pressure setting device with the above-described configuration, the ECU 20 sets the belt clamping pressure according to the following procedure so that the belt clamping pressure corresponds to the input torque fluctuations.

Figure 4:
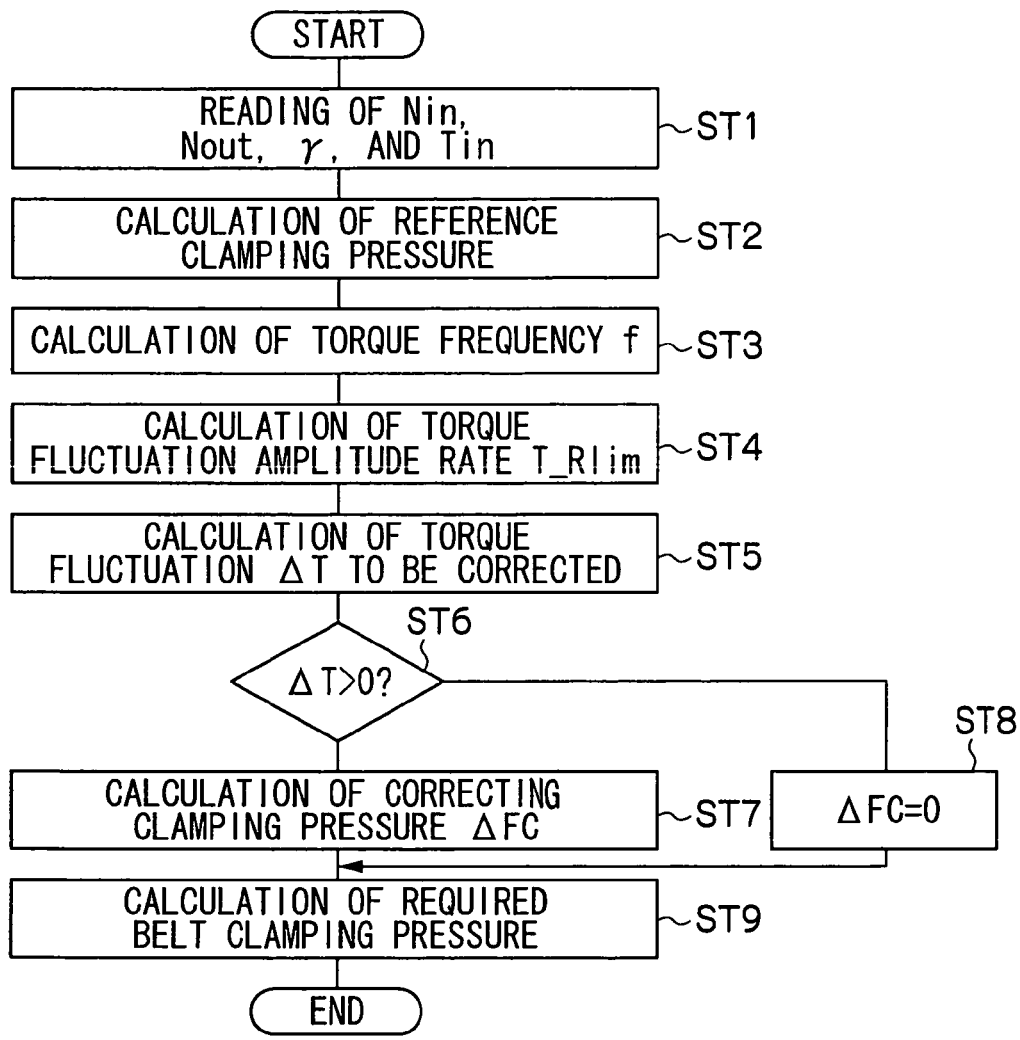
FIG. 4 is a flow diagram showing a processing procedure of the ECU.

FIG. 4 is a flow diagram showing the processing procedure of the ECU 20. Each component circuit in the ECU 20 executes predetermined processing from a step ST1 to a step ST9 in this order.

At the step ST1, the reference clamping pressure computing circuit 25 reads the input torque Tin detected by the input torque detection circuit 23 and the speed reducing ratio γ computed by the speed reducing ratio computing circuit 24. The torque fluctuation correcting clamping pressure computing circuit 26 reads the number of input revolutions Nin detected by the input revolution number detection circuit 21, the input torque Tin detected by the input torque detection circuit 23, and the speed reducing ratio γ computed by the speed reducing ratio computing circuit 24. Then, the processing proceeds to a step ST2.

At the step ST2, the reference clamping pressure computing circuit 25 computes a diameter R2 of belt charge (namely, a function of the speed reducing ratio γ) for the secondary sheave, using the speed reducing ratio γ. Then, the reference clamping pressure Fc_b is computed according to the following formula (1), using the input torque Tin, the speed reducing ratio γ, the diameter R2 of belt charge, and the predetermined parameters. Then, the processing proceeds to a step ST3:

$$Fc\_b = \frac{Tin \cdot \gamma \cdot \cos(\beta)}{2 \cdot \mu max \cdot R2} - \Delta N \quad (1)$$

μ max: a maximum coefficient of friction between the belt and the sheave;

R2: a diameter of the belt at the secondary sheave [m];

β: an amount the sheave is opened (=11°); and

ΔN: centrifugal oil pressure [N] in the sheave, which is caused by revolution.

At the step ST3, the torque fluctuation correcting clamping pressure computing circuit 26 calculates the torque fluctuation frequency f according to a formula (2), based on the number of input revolutions Nin.

$$f = 2 \times \frac{Nin}{60} \quad (2)$$

The formula (2) is a computing formula for a four-cylinder engine, however, the formula (2) of course can be changed according to the number of cylinders. Moreover, the number of engine revolutions may be used instead of the number of input revolutions Nin.

At a step ST4, the torque fluctuation correcting clamping pressure computing circuit 26 calculates the torque fluctuation amplitude rates T_Rlim at the macro slip limit by referring to the table of torque fluctuation amplitude rates under conditions of the speed reducing ratio γ and the torque fluctuation frequency f obtained at the step ST3. Then, the processing proceeds to a step ST5.

At the step ST5, the torque fluctuation correcting clamping pressure computing circuit 26 calculates the torque fluctuation ΔT to be corrected in accordance with a computing formula (3), using the input torque Tin detected in the input torque detection circuit 23, the torque fluctuation amplitude rates T_Rlim obtained at the step ST4, and a maximum value T_Rmax of predetermined torque fluctuation amplitude rates. Then, the processing proceeds to a step ST6.

$$\Delta T = (T\_Rmax - T\_Rlim) \cdot Tin \quad (3)$$

At the step ST6, the torque fluctuation correcting clamping pressure computing circuit 26 judges whether the torque fluctuation ΔT is larger than 0 or not. Then, the processing proceeds to a step ST7 when the torque fluctuation ΔT is larger than 0 and proceeds to a step ST8 when the torque fluctuation ΔT is equal to or smaller than 0.

At the step ST7, the torque fluctuation correcting clamping pressure computing circuit 26 computes the correcting clamping pressure ΔFc according to a formula (4), using the diameter R2 of belt charge at the secondary sheave, the speed reducing ratio γ, the torque fluctuation ΔT, and the predetermined parameters which have been set beforehand. The processing proceeds to the step ST9.

$$\Delta Fc = \frac{\Delta T \cdot \gamma \cdot \cos(\beta)}{2 \cdot \mu max \cdot R2} \quad (4)$$

On the other hand, the torque fluctuation correcting clamping pressure computing circuit 26 sets the correcting clamping pressure ΔFc as 0 at the step ST8. The processing proceeds to the step ST9. The reason being that the macro slip can be prevented only with the reference clamping pressure Fc_b. Thereby, increasing belt clamping pressure more than necessary is prevented, improving fuel consumption.

At the step ST9, the required clamping pressure computing circuit 27 computes the required belt clamping pressure Fc by adding of the correcting clamping pressure ΔFc to the reference clamping pressure Fc_b in accordance with a computing formula (5).

$$Fc = Fc\_b + \Delta Fc \tag{5}$$

Then, the required clamping pressure computing circuit 27 controls the CVT hydraulical control valve 15 shown in FIG. 1 so that the belt clamping pressure becomes the required belt clamping pressure Fc.

As described above, when the belt slip is about to occur, the belt clamping pressure setting device according to the first embodiment can ensure prevention of the belt slip by computing, according to the torque fluctuation frequency f, that is, the number of input revolutions Nin, the correcting clamping pressure ΔFc which is required to prevent the macro slip caused by the torque fluctuation.

Furthermore, the belt clamping pressure setting device can reduce the pump loss in the CVT hydraulic control to improve the fuel consumption, because the correcting clamping pressure ΔFc is not required at a predetermined number of input revolutions (1500 rpm in the embodiment as shown in the FIG. 13 described later) or more.

Thus, the belt clamping pressure setting device can realize both of prevention of the belt slip and improvement of the fuel consumption by setting necessary and minimum belt clamping pressure according to the number of input revolutions when too much torque is instantaneously caused during the fluctuations of the input torque.

Second Embodiment

Next, a second embodiment according to the invention will be explained. Here, parts different from the first embodiment will be mainly explained. Therefore, similar parts to those previously described with reference to the first embodiment are denoted by the same reference numbers, and detailed description thereof will be eliminated.

Figure 5:
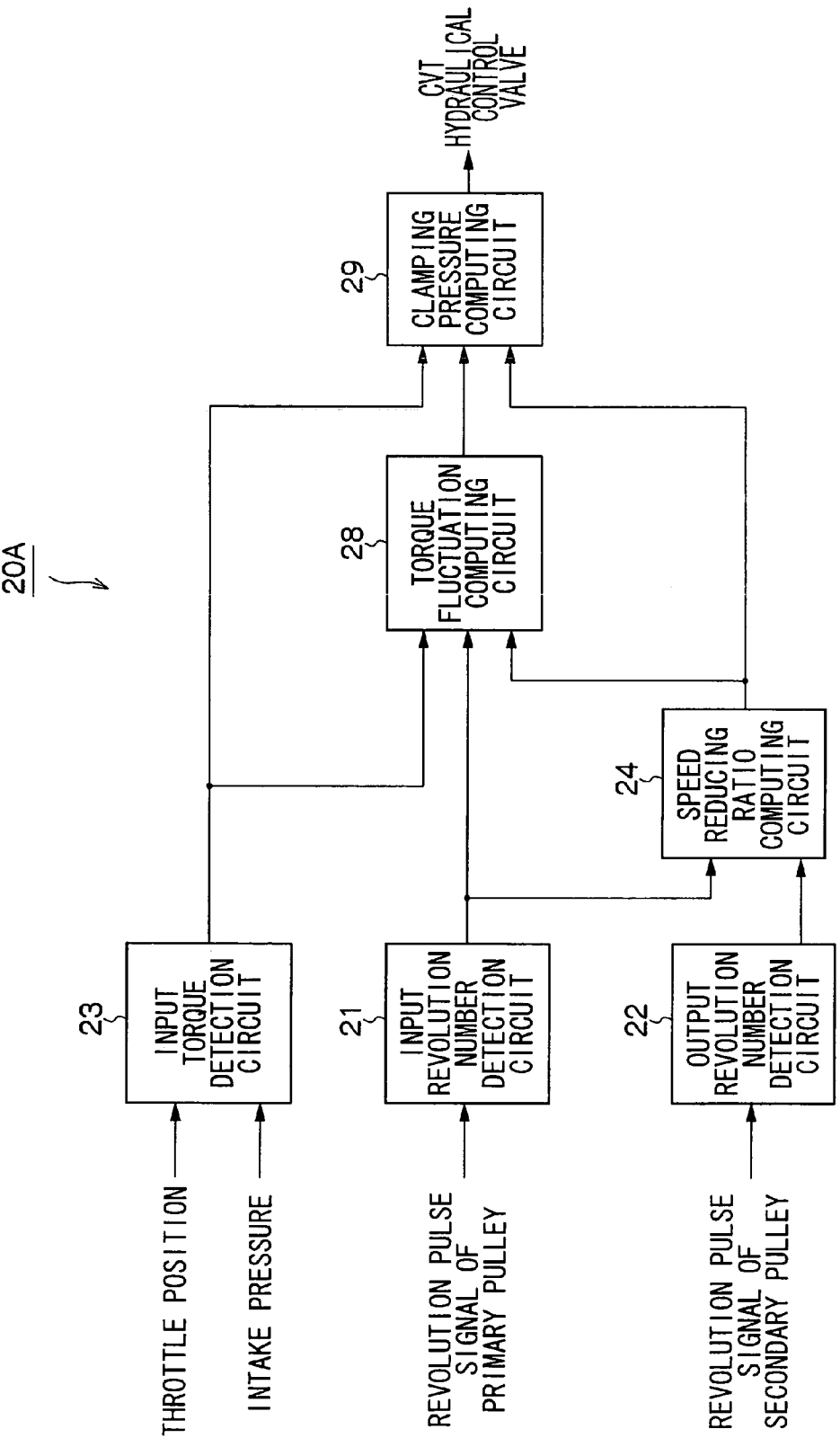
FIG. 5 is a block diagram showing a configuration of an ECU in a belt clamping pressure setting device according to a second embodiment.

FIG. 5 is a block diagram showing a configuration of the ECU 20A in a belt clamping pressure setting device according to the second embodiment. The ECU 20A comprises a torque fluctuation computing circuit 28 and a clamping pressure computing circuit 29, in stead of the reference clamping pressure computing circuit 25, the torque fluctuation correcting clamping pressure computing circuit 26, and the required clamping pressure computing circuit 27 in the ECU 20 shown in FIG. 2.

The torque fluctuation computing circuit 28 stores the table of torque fluctuation amplitude rates which explained in the first embodiment in order to compute the torque fluctuation ΔT to be corrected. The torque fluctuation computing circuit 28 computes the torque fluctuation ΔT, based on the a number of input revolutions Nin detected by the input revolution number detection circuit 21, the input torque Tin detected by the input torque detection circuit 23, and the speed reducing ratio γ computed by the speed reducing ratio computing circuit 24.

Specifically, at first the torque fluctuation computing circuit 28 calculates the torque fluctuation ΔT to be corrected by processing based on the same steps as those from ST3 through ST5 which are shown in FIG. 4.

Then, the torque fluctuation computing circuit 28 supplies the calculated torque fluctuation ΔT to the clamping pressure computing circuit 29 as it is when the torque fluctuation ΔT is larger than 0. When the torque fluctuation ΔT is not larger than 0, the torque fluctuation ΔT is set to be 0, and the set torque fluctuation ΔT is supplied to the clamping pressure computing circuit 29. Thus, raising belt clamping pressure is more than necessary prevented and the fuel consumption is improved.

The clamping pressure computing circuit 29 computes clamping pressure Fc according to the following formula (6), using the input torque Tin detected by the input torque detection circuit 23, the torque fluctuation ΔT supplied from the torque fluctuation computing circuit 28, and predetermined parameters.

$$Fc = \frac{(Tin + \Delta T) \cdot \gamma \cdot \cos(\beta)}{2 \cdot \mu\max \cdot R2} - \Delta N \tag{6}$$

Here, the formula (6) is equivalent to the formula (5). Each parameter is similar to those in the first embodiment.

As described above, when belt slip is about to occur, the belt clamping pressure setting device according to the second embodiment can ensure prevention of the belt slip by computing, according to the torque fluctuation frequency f, that is, the number of input revolutions Nin, the torque fluctuation ΔT required to prevent the macro slip caused by the torque fluctuation.

Furthermore, the belt clamping pressure setting device can reduce the pump loss in the CVT hydraulic control to improve the fuel consumption, because the torque fluctuation ΔT is not required at the predetermined number of input revolutions (1500 rpm in the embodiment) or more.

Here, the invention is not limited to the above-described embodiments, but the invention could be applied to ones with various changes and modifications within the spirit or scope of the invention as defined in the claims.

For example, the ECU 20 may carry out the computing processing using the number of engine revolutions, instead of the number of input revolutions Nin, in the above-described first and second embodiments.

[Preparation of Table of Torque Fluctuation Amplitude Rates]

Then, the table of torque fluctuation amplitude rates used in the first and second embodiments will be explained. The table of torque fluctuation amplitude rates is made, based on simulation.

Figure 6:
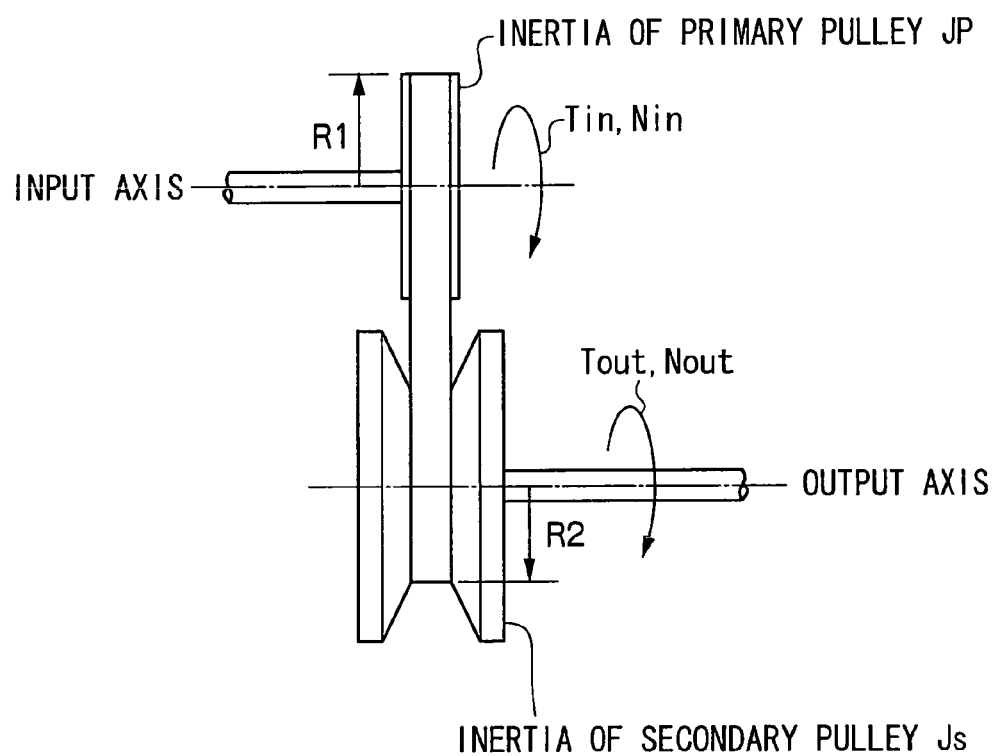
FIG. 6 is a view explaining a simulation model by which a table of torque fluctuation amplitude rates is prepared.

FIG. 6 is a view explaining a simulation model by which the table of torque fluctuation amplitude rates is prepared. The simulation model is made, considering a CVT bench mark test. In the model, torque control is applied to the input side, and revolution number control is applied to the output side. R1 is a diameter of belt charge at the primary belt pulley, and Nout is an output torque.

Figure 7A:
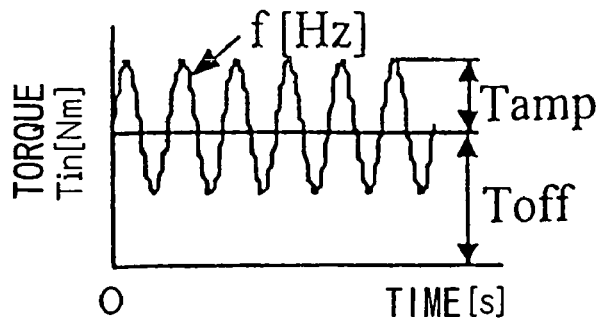
FIG. 7A is a view showing input torque Tin [Nm].
Figure 7B:
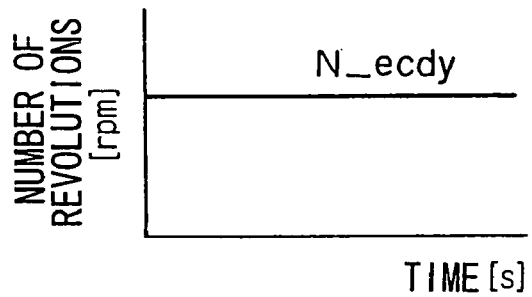
FIG. 7B is a view showing output-side revolution numbers Nout (=N_ecdy) [rpm].
Figure 7C:
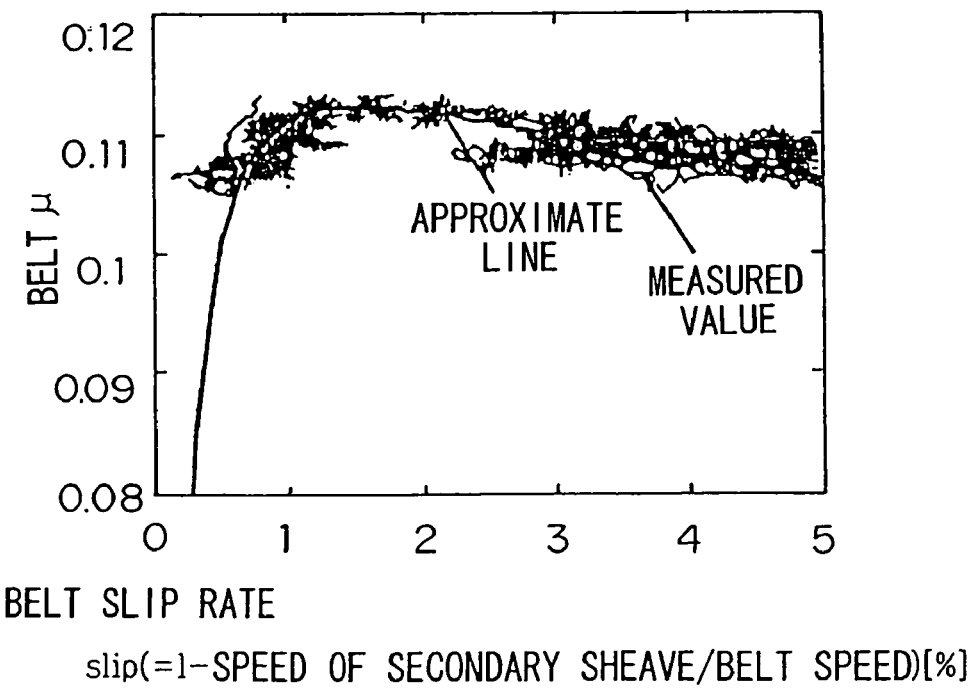
FIG. 7C is a view showing belt p characteristics to belt slip rates.

FIG. 7A is a view showing input torque Tin [Nm], FIG. 7B is a view showing output-side number of revolutions Nout (=N_ecdy) [rpm], and FIG. 7C is a view showing belt μ characteristics for belt slip rates.

Revolution number testing apparatus at the input side sets average input torque Toff as critical torque just before the macro slip is caused, and supplies a sinusoidal torque fluctuation amplitude Tamp about the average input torque Toff. The number of revolutions of the revolution number testing apparatus at the output side, and the speed ratio of the CVT are ideally controlled. That is, the number of revolutions at the output side and the speed ratio of the CVT are kept at a constant value at any time.

The belt slip rate of the CVT is calculated, based on the difference between the belt speed and the speed of the secondary sheave when the sheave speed of the primary belt pulley on the supposition that there is no belt slip is assumed to be the belt speed. The μ characteristics of the belt at the secondary belt pulley side are obtained by application of curve fitting to the numbers of revolutions and the speed reducing ratio in μ measurement results of a CVT in actual use, respectively.

FIG. 8 is a block diagram of a computing processing unit for the simulation model. The computing processing unit of the simulation model comprises: a primary belt pulley angular speed computing section 31; a primary belt pulley speed computing section 32; a belt slip rate computing section 33; a secondary belt pulley output torque computing section 34; and a secondary belt pulley speed computing section 35.

The primary belt pulley angular speed computing section 31 computes a primary belt pulley angular speed to according to a formula (7), using the input torque Tin, the speed reducing ratio γ, the output torque Tout computed in the secondary belt pulley output torque computing section 34.

$$\omega 1 = \int (Tin - Tout/\gamma) \cdot \cos(\beta)/Jp \, dt \quad (7)$$

Here, Jp is primary belt pulley inertia shown in FIG. 6.

The primary belt pulley speed computing section 32 computes primary belt pulley speed Prim_V according to a formula (8), using the primary belt pulley angular speed ω1 computed in the primary belt pulley angular speed computing section 31.

$$Prim\_V = \omega 1 \cdot R1 \quad (8)$$

The belt slip rate computing section 33 computes a belt slip rate Slip according to a formula (9), using the primary belt pulley speed Prim_V computed in the primary belt pulley speed computing section 32, and secondary belt pulley speed Secd_V computed in the secondary belt pulley speed computing section 35.

$$Slip = 1 - Secd\_V/Prim\_V \quad (9)$$

Here, the belt slip is decided, based on the belt slip rate Slip obtained as described above.

The secondary belt pulley output torque computing section 34 computes the output torque Tout according to a formula (10) using the belt slip rate Slip computed in the belt slip rate computing section 33. Here, the number of output revolutions Nout meets a formula (11). The belt μ meets a formula (12) which is a tire model with the name of the Magic Formula.

$$Tout = 2 \cdot \mu \cdot Fc \cdot R2/\cos(\beta) \quad (10)$$

$$Nout = N\_ecdy \quad (11)$$

$$\mu = \mu max \cdot \sin(C \cdot a \tan(B \cdot slip - \ldots E \cdot (B \cdot slip - a \tan (B \cdot slip))))/D \quad (12)$$

The secondary belt pulley speed computing section 35 computes a secondary belt pulley speed Secd_V according to a formula (13), using a secondary belt pulley angular speed ω2.

$$Secd\_V = \omega 2 \cdot R2 \quad (13)$$

Subsequently, testing results of the simulation model will be explained.

Figure 9A:
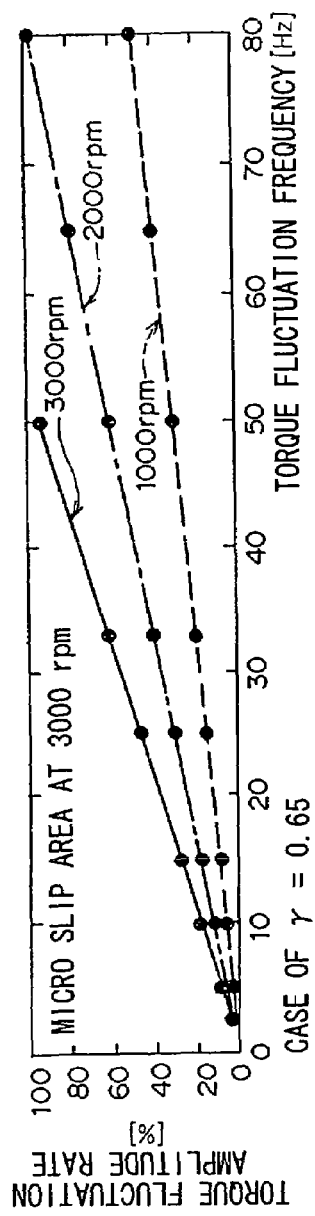
FIG. 9A is a view showing torque fluctuation amplitude rates to torque fluctuation frequencies f for each number of input revolutions when a speed reducing ratio $\gamma$ is 0.65.
Figure 9B:
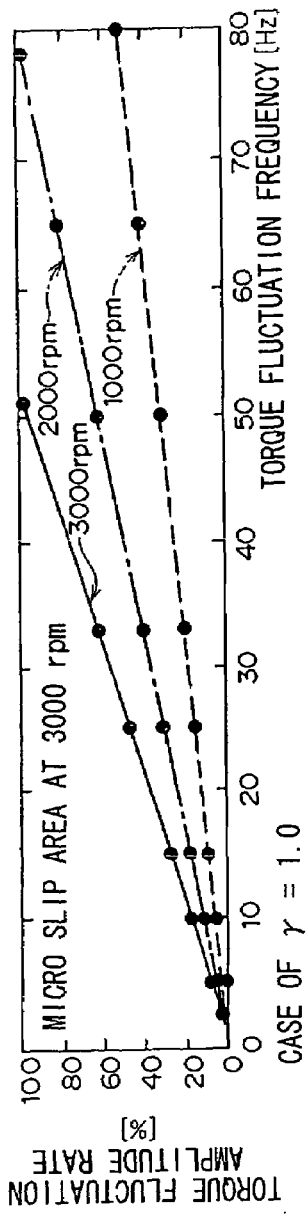
FIG. 9B is a view showing torque fluctuation amplitude rates to torque fluctuation frequencies f for each number of input revolutions when a speed reducing ratio $\gamma$ is 1.0.
Figure 9C:
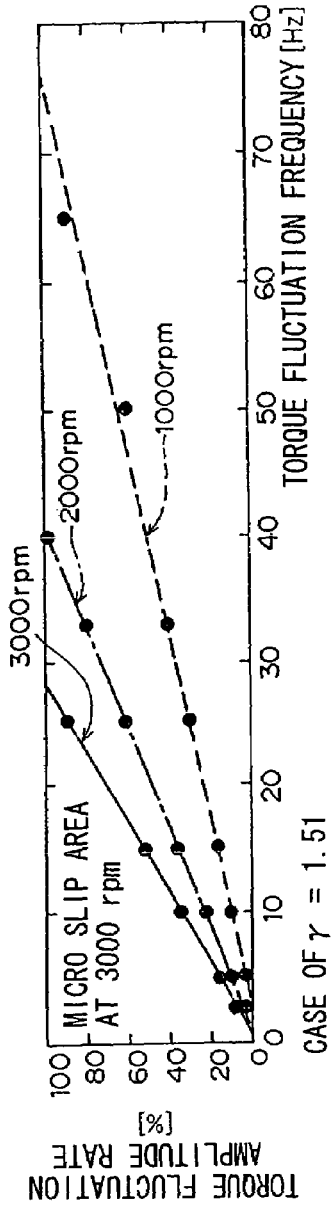
FIG. 9C is a view showing torque fluctuation amplitude rates to torque fluctuation frequencies f for each number of input revolutions when a speed reducing ratio $\gamma$ is 1.51.

FIGS. 9A through 9C are views showing the torque fluctuation amplitude rates corresponding to the torque fluctuation frequencies f for each number of input revolutions: FIG. 9A is for a speed reducing ratio γ of 0.65; FIG. 9B is for a ratio γ of 1.0; and FIG. 9C is for a ratio γ of 1.51. FIGS. 9A through 9C indicate the following characteristics for the macro slip limit of the torque fluctuation amplitude rates.

(Characteristic 1) A larger number of input revolutions causes the larger limit of the macro slip in the same torque fluctuation frequency.

(Characteristic 2) The limit of the macro slip is larger when the speed is more reduced.

(Characteristic 3) The torque fluctuation amplitude rate linearly increases with the rise in the torque fluctuation frequency.

Here, a reason for the (Characteristic 1), that is, the reason for "a larger number of input revolutions causes the larger limit of the macro slip in the same torque fluctuation frequency" will be located.

FIGS. 10A through 10E show changes in the parameters for each number of revolutions (Nin=1000, and 3000 rpm): FIG. 10A is a view showing the input torque; FIG. 10B is that showing the number of input revolutions; FIG. 10C is that showing the fluctuation in the slip speed; FIG. 10D is that showing the belt slip rate; and FIG. 10E is that showing the belt μ.

It is found in FIGS. 10A through 10E that the same torque fluctuation amplitude causes the same fluctuation in the slip speed regardless of the number of input revolutions. However, the larger number of input revolutions causes the larger belt speed, and the relatively smaller belt slip rate. As a result, it becomes more difficult to exceed the p max and the macro slip limit becomes larger.

Then, a reason for the (Characteristic 2), that is, the reason for "the limit of the macro slip is larger when the speed is more reduced" will be located.

Figure 11:
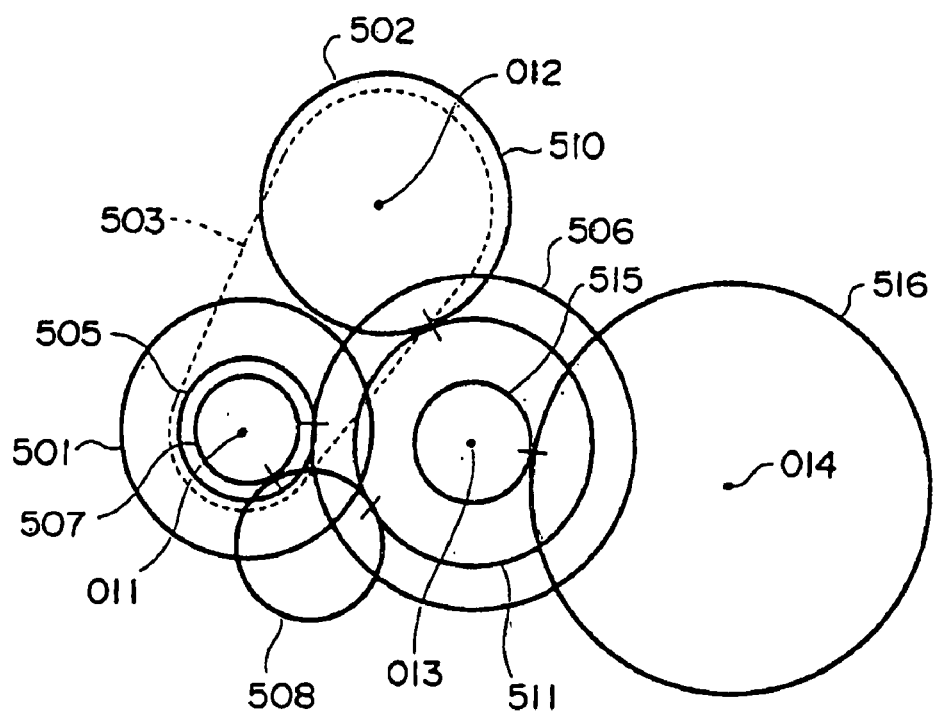
FIG. 11 is a view showing belt $\mu$ characteristics to belt slip rates for each speed reducing ratio $\gamma$.

FIG. 11 is a view showing the belt μ characteristics to the belt slip rates for each speed reducing ratio γ. The belt slip rates (inverse black-triangle marks in the drawing) at the belt μ max become larger when the speed is more reduced (the speed reducing ratio becomes smaller). That is, it becomes more difficult to exceed the μ max when the speed is more reduced, and the macro slip limit becomes larger.

Then, a reason for the (Characteristic 3), that is, the reason for "the torque fluctuation amplitude rate linearly increases with the rise in the torque fluctuation frequency" will be located.

FIGS. 12A and 12B are views showing the changes in the input torque and the belt μ with respect to time: FIG. 12A is for a torque fluctuation frequency f of 10 [Hz] (no macro slip); and FIG. 12B is for a torque fluctuation frequency f of 5 [Hz].

A lower torque fluctuation frequency f causes the more preferable response of the pulley inertia to the input torque. Moreover, lower torque fluctuation frequency f causes the larger change in the number of revolutions, that is, the larger belt slip rate by the torque fluctuation.

When the belt slip rate becomes larger, the gradient of the belt μ becomes negative to cause further larger belt slip, and the macro slip is finally generated. Since there is no response of the pulley inertia when the torque fluctuation frequency f increases, the belt slip rate does not increase so much. Thereby, the macro slip limit is improved as shown in FIG. 13.

Figure 13A:
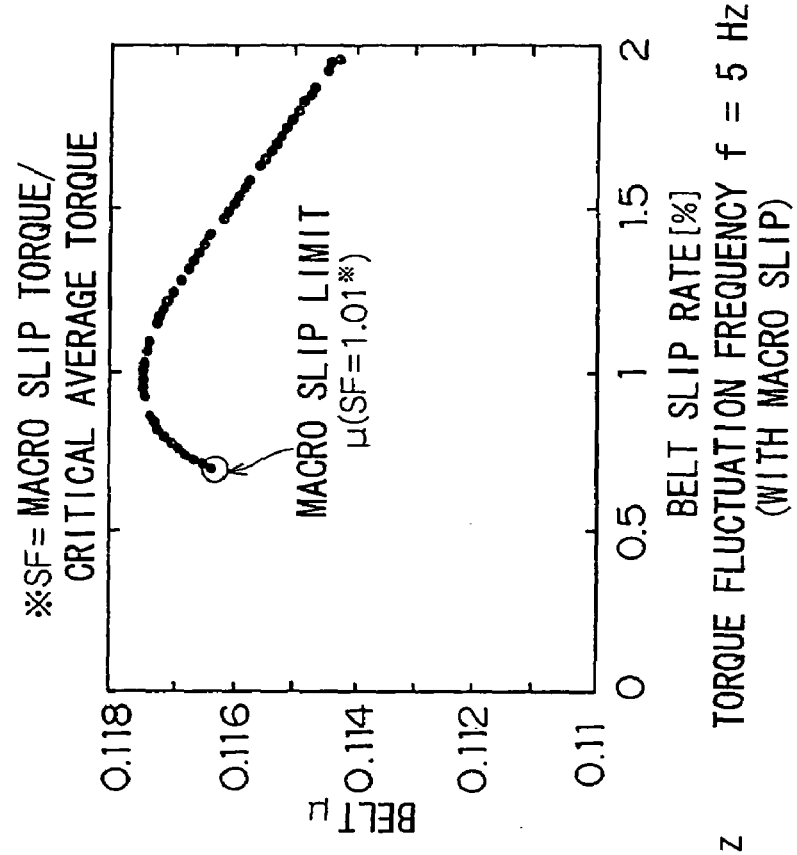
FIG. 13A is a view showing belt μ characteristics corresponding to belt slip rates for a torque fluctuation frequency f of 10 [Hz] (no macro slip).
Figure 13B:
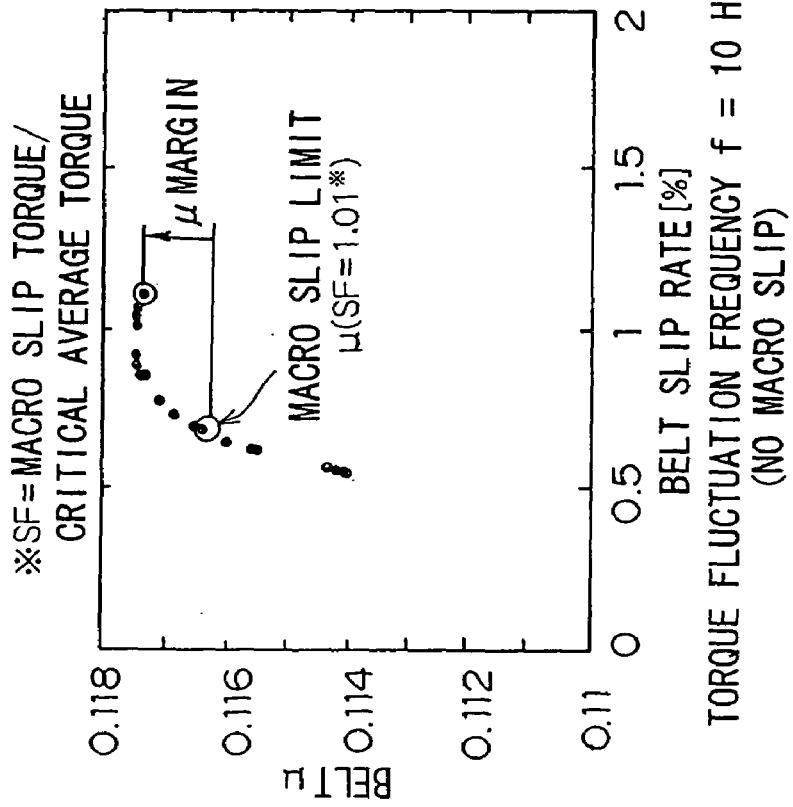
FIG. 13B is a view showing belt μ characteristics corresponding to belt slip rates for a torque fluctuation frequency f of 5 [Hz] (with macro slip).

FIGS. 13A and 13B are views showing the belt μ characteristics corresponding to the belt slip rate: FIG. 13A is for a torque fluctuation frequency f of 10 [Hz] (no macro slip); and FIG. 13B is for a torque fluctuation frequency f of 5 [Hz] (with macro slip); That is, the belt slip rate in FIG. 12 is plotted in abscissa, and the belt μ is done in ordinate in the FIGS. 13A and 13B in order to show the results of examinations on conditions under which the macro slip is caused.

A μ margin, as shown in FIG. 13A, is required to prevent the macro slip. That is, a belt μ at a point, after a maximum point at which the belt μ exceeds the μ max under assumption that a point at which critical average torque just before the macro slip is caused is applied is set as a starting point, is required to be larger than the critical μ. Unless the above requirement is met, the macro slip occurs.

Based on the above-described results, an area in which correcting clamping pressure for torque fluctuation is required is obtained according to the number of input revolutions for each speed reducing ratio.

Figure 14A:
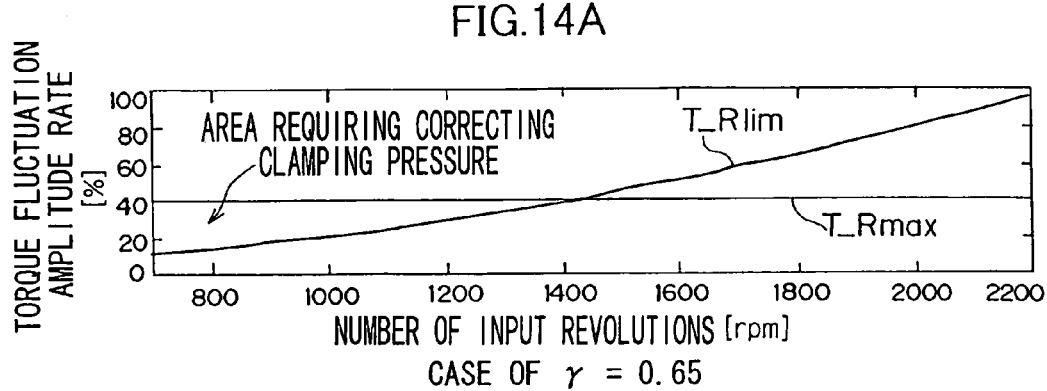
FIG. 14A is a view showing torque fluctuation amplitude rates at the macro slip limit to number of input revolutions for a speed reducing ratio γ of 0.65.
Figure 14B:
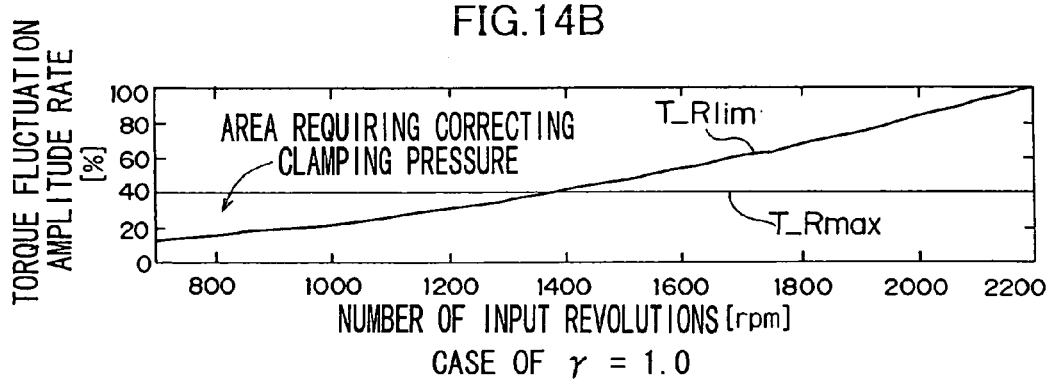
FIG. 14B is a view showing torque fluctuation amplitude rates at the macro slip limit to number of input revolutions for a speed reducing ratio γ of 1.0.
Figure 14C:
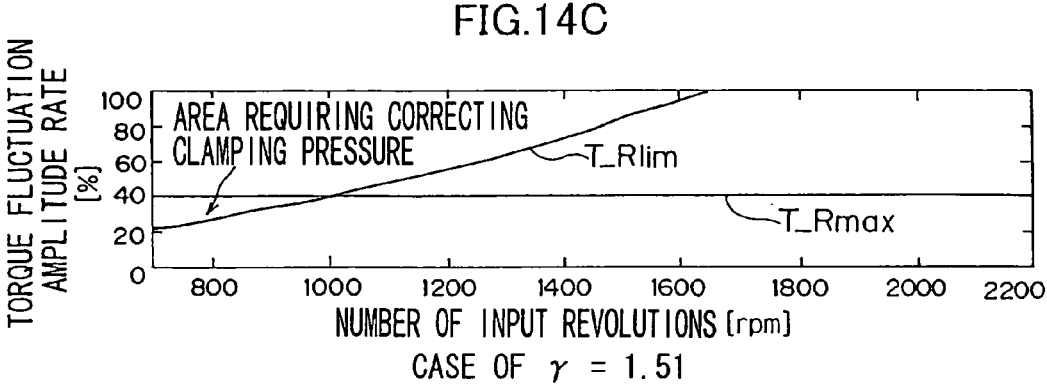
FIG. 14C is a view showing torque fluctuation amplitude rates at the macro slip limit to number of input revolutions for a speed reducing ratio γ of 1.51.

FIGS. 14A through 14C are views showing the torque fluctuation amplitude rate at the macro slip limit to the number of input revolutions: FIG. 14A is for a speed reducing ratio γ of 0.65; FIG. 14B is for a speed reducing ratio γ of 1.0; and FIG. 14C is for a speed reducing ratio γ of 1.51.

According to FIGS. 14A through 14C, the correcting clamping pressure ΔFc is required in a low idling speed area in which the number of input revolutions are within the range of 750 rpm to 1400 rpm. But the correcting clamping pressure ΔFc is unnecessary in an area in which the number of input revolutions is 1400 rpm or more. Then, FIGS. 3A through 3C are obtained when the number of input revolutions Nin is converted into the torque fluctuation frequency f according to the above-described formula (2). That is, the table of torque fluctuation amplitude rates is corresponding to FIGS. 13A and 13B in which the above-described simulation results have been summarized.

Here, it is obvious that the invention is not limited to the above-described embodiments, but the invention could be applied to ones with various changes and modifications which are made without departing from the spirit or scope of the invention as defined in the appended claims.

What is claimed is:

1. A belt clamping pressure setting device comprising:
   a belt clamping pressure setting unit that sets a belt clamping pressure of a continuously variable transmission that includes an input-side pulley, an output-side pulley, and a belt running between the input-side pulley and the output-side pulley;
   an input revolution detection sensor that detects a number of input revolutions of the input-side pulley;
   an output revolution detection sensor that detects a number of output revolutions of the output-side pulley;
   an input torque detection unit that detects an input torque to the input-side pulley;
   a reference clamping pressure computing unit that computes a reference clamping pressure, based on the number of input revolutions detected by the input revolution detection sensor, the number of output revolutions detected by the output revolution detection sensor, and the input torque detected by the input torque detection unit; and
   a belt clamping pressure computing unit that computes the belt clamping pressure to be set by the belt clamping pressure setting unit based on the reference clamping pressure and a correction value computed in accordance with the number of input revolutions detected by the input revolution detection sensor or a torque fluctuation frequency obtained from the number of input revolutions.

2. A belt clamping pressure setting device according to claim 1, wherein
   the belt clamping pressure computing unit computes the belt clamping pressure, based on the reference clamping pressure and the correction value computed in accordance with the number of input revolutions or the torque fluctuation frequency when the number of input revolutions detected by the input revolution detection sensor is in a low area, or when the torque fluctuation frequency obtained from the number of input revolutions is in a low area.

3. A belt clamping pressure setting device according to claim 1, further comprising
   a speed reducing ratio computing unit that computes a speed reducing ratio, based on the number of input revolutions detected by the input revolution detection sensor, and the number of output revolutions detected by the output revolution detection sensor, wherein
   the belt clamping pressure computing unit computes the correction value in accordance with the speed reducing ratio computed by the speed reducing ratio computing unit and the number of input revolutions or the torque fluctuation frequency.

4. A belt clamping pressure setting device according to claim 3, wherein the belt clamping pressure computing unit:
   refers to a table displaying a relationship between each of the speed reducing ratio, an input torque fluctuation amplitude at or before a macro slip limit and the number of input revolutions or the torque fluctuation frequency;
   obtains an input torque frequency amplitude rate at or before the macro slip limit based on the speed reducing ratio calculated by the speed reducing ratio detecting unit and the number of input revolutions detected by the input revolution detecting sensor or the torque fluctuation frequency obtained from the number of input revolutions; and
   computes the correction value using the obtained input torque frequency amplitude rate.

5. A belt clamping pressure setting device according to claim 4, wherein,
   the table indicates a relationship in which the input torque fluctuation amplitude rate at or before the macro slip limit increases in accordance with the number of input revolutions increasing or the torque fluctuation frequency getting higher.

6. A belt clamping pressure setting device according to claim 5, wherein,
   the table indicates a relationship in which the input torque fluctuation amplitude rate at or before the macro slip limit linearly increases in accordance with the number of input revolutions increasing or the torque fluctuation frequency getting higher.

7. A belt clamping pressure setting device according to claim 5, wherein,
   the table indicates a relationship in which the input torque fluctuation amplitude rate at or before the macro slip limit increases in accordance with the speed reducing ratio increasing.

8. A belt clamping pressure setting device, comprising:
   a belt clamping pressure setting unit that sets a belt clamping pressure of a continuously variable transmission that includes an input-side pulley, an output-side pulley, and a belt running between the input-side pulley and the output-side pulley;
   an input revolution detection sensor that detects a number of input revolutions of the input-side pulley;
   an output revolution detection sensor that detects a number of output revolutions of the output-side pulley;
   an input torque detection unit that detects an input torque to the input-side pulley;
   a torque fluctuation computing unit that computes a torque fluctuation to be corrected in accordance with the number of input revolutions detected by the input revolution detection sensor or a torque fluctuation frequency obtained from the number of input revolutions; and a belt clamping pressure computing unit that computes the belt clamping pressure to be set by a belt clamping pressure setting unit, based on the number of input revolutions detected by the input revolution detection sensor, the number of output revolutions detected by the output revolution detection sensor, the input torque detected by the input torque detection unit, and the torque fluctuation computed by the torque fluctuation computing unit.

9. A belt clamping pressure setting device according to claim 8, further comprising:

a speed reducing ratio computing unit that computes a speed reducing ratio, based on the number of input revolutions detected by the input revolution detection sensor, and the number of output revolutions detected by the output revolution detection sensor, wherein the torque fluctuation computing unit computes the torque fluctuation in accordance with the speed reducing ratio computed by the speed reducing ratio computing unit.

10. A belt clamping pressure setting device according to claim 9, wherein the torque fluctuation computing unit:

refers to a table displaying a relationship between each of the speed reducing ratio, an input torque fluctuation amplitude at or before a macro slip limit and the number of input revolutions or the torque fluctuation frequency;

obtains an input torque frequency amplitude rate at or before the macro slip limit based on the speed reducing ratio calculated by the speed reducing ratio detecting unit and the number of input revolutions detected by the input revolution detecting sensor or the torque fluctuation frequency obtained from the number of input revolutions; and computes the torque fluctuation using the obtained input torque frequency amplitude rate.

11. A belt clamping pressure setting method for setting a belt clamping pressure of a continuously variable transmission that includes an input-side pulley, an output-side pulley, and a belt running between the input-side pulley and the output-side pulley, the method comprising:

a number of input revolutions of the input-side pulley a number of output revolutions of the output-side pulley, and input torque to the input-side pulley from an input revolution detection sensor, an output revolution detection sensor, and an input torque detection unit, respectively;

computing a reference clamping pressure, based on the number of input revolutions, the number of output revolutions, and the input torque;

computing the belt clamping pressure, based on the reference clamping pressure and a correction value computed in accordance with the number of input revolutions or a torque fluctuation frequency obtained from the number of input revolutions.

12. A belt clamping pressure setting method for setting a belt clamping pressure of a continuously variable transmission that includes an input-side pulley, an output-side pulley, and a belt running between the input-side pulley and the output-side pulley, the method comprising:

reading a number of input revolutions of the input-side pulley, a number of output revolutions of the output-side pulley, and input torque to the input-side pulley from an input revolution detection sensor, an output revolution detection sensor, and an input torque detection unit, respectively;

computing a torque fluctuation to be corrected, in accordance with the number of input revolutions, or a torque fluctuation frequency obtained from the number of input revolutions; and computing the belt clamping pressure, based on the number of input revolutions, the number of output revolutions, the input torque, and the torque fluctuation.

13. A belt clamping pressure setting device comprising:

a belt clamping pressure setting means for setting a belt clamping pressure of a continuously variable transmission that includes an input-side pulley, an output-side pulley, and a belt running between the input-side pulley and the output-side pulley;

an input revolution detection means for detecting a number of input revolutions of the input-side pulley;

an output revolution detection means for detecting a number of output revolutions of the output-side pulley;

an input torque detection means for detecting an input torque to the input-side pulley;

a reference clamping pressure computing means for computing a reference clamping pressure, based on the number of input revolutions detected by the input revolution detection means, the number of output revolutions detected by the output revolution detection means, and the input torque detected by the input torque detection means; and a belt clamping pressure computing means for computing the belt clamping pressure to be set by the belt clamping pressure setting means based on the reference clamping pressure and a correction value computed in accordance with the number of input revolutions detected by the input revolution detection means or a torque fluctuation frequency obtained from the number of input revolutions.

14. A belt clamping pressure setting device, comprising:

a belt clamping pressure setting means for setting a belt clamping pressure of a continuously variable transmission that includes an input-side pulley, an output-side pulley, and a belt running between the input-side pulley and the output-side pulley;

an input revolution detection means for detecting a number of input revolutions of the input-side pulley;

an output revolution detection means for detecting a number of output revolutions of the output-side pulley;

an input torque detection means for detecting an input torque to the input-side pulley;

a torque fluctuation computing means for computing a torque fluctuation to be corrected in accordance with the number of input revolutions detected by the input revolution detection means or a torque fluctuation frequency obtained from the number of input revolutions; and a belt clamping pressure computing means for computing the belt clamping pressure to be set by a belt clamping pressure setting means, based on the number of input revolutions detected by the input revolution detection means, the number of output revolutions detected by the output revolution detection means, the input torque detected by the input torque detection means, and the torque fluctuation computed by the torque fluctuation computing means.

* * * * *